United States Patent
Akopian (10) Patent No.: US 7,272,168 B2
(45) Date of Patent: Sep. 18, 2007

(54) DETERMINING THE CORRELATION BETWEEN RECEIVED SAMPLES AND AVAILABLE REPLICA SAMPLES

(75) Inventor: David Akopian, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 777 days.

(21) Appl. No.: 10/404,931

(22) Filed: Apr. 1, 2003

(65) Prior Publication Data

US 2004/0196894 A1   Oct. 7, 2004

(51) Int. Cl.
*H04B 1/707* (2006.01)

(52) U.S. Cl. ........................ 375/150; 375/343

(58) Field of Classification Search .............. 375/150, 375/152, 142, 343, 130, 140, 147, 316, 340
See application file for complete search history.

(56) References Cited

U.S. PATENT DOCUMENTS

| | | | |
|---|---|---|---|
| 6,005,899 A | 12/1999 | Khayrallah | |
| 6,366,938 B1 | 4/2002 | Levison et al. | |
| 6,831,956 B1 * | 12/2004 | Schmidl et al. | 375/343 |

FOREIGN PATENT DOCUMENTS

| | | |
|---|---|---|
| WO | PCT/IB02/04420 | 10/2002 |
| WO | WO2004/038944 | 5/2004 |

* cited by examiner

*Primary Examiner*—Kevin Burd
(74) *Attorney, Agent, or Firm*—Ware, Fressola, Van Der Sluys & Adolphson, LLP (57) ABSTRACT

The invention relates to a method, a processing unit and a system for determining the correlation between consecutive sets of samples of a received, code modulated signal and replica samples. In order to reduce the computational load, the positions of samples in said replica code sequence are grouped, each of these positions and a predetermined number of respective subsequent positions forming a subgroup and each group comprising the respective first position of all subgroups with positions associated with a similar composition of consecutive replica samples. The method combines those values of samples of the first set of samples, which are associated by their position to a respective group, separately for each group to obtain a respective preliminary result. Determining a correlation value for each of the sets of samples then comprises combining the obtained preliminary results for all groups separately for each of the sets of samples.

14 Claims, 4 Drawing Sheets

DETERMINING THE CORRELATION BETWEEN RECEIVED SAMPLES AND AVAILABLE REPLICA SAMPLES

FIELD OF THE INVENTION

The invention relates to a method, a processing unit and a system for determining the correlation between a plurality of sets of samples of a code modulated signal received at a receiver and samples of an available replica code sequence.

BACKGROUND OF THE INVENTION

The correlation between a code modulated signal received at a receiver and an available replica code sequence has to be determined for example in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. To this end, a synchronization has to be performed between the received code modulated signal and an available replica code sequence. Usually, an initial synchronization called acquisition is followed by a fine synchronization called tracking. In both synchronization scenarios, a correlator is used to find the best match between the replica code sequence and the received signal and thus to find their relative shift called code phase. The search can be performed with different assumptions on an additional frequency modulation of the received signal. Such an additional modulation may occur for example due to a Doppler effect and/or a receiver clock inaccuracy and be as large as +/−6 kHz. The phase of the received signal relative to the available replica sequence can have any possible value due to uncertainties in the position of the satellite and the time of transmission of the received signal.

A correlator aligns an incoming signal with a replica code sequence with different assumptions on the code-phase. The correlator then multiplies the incoming signal and the replica code sequence elementwise and integrates the resulting products to obtain a correlation value for each code-phase. If the alignment is correct, the correlation will be higher than in the case of a misalignment. Thus, the correlation peak is an indication of the correct code-phase.

Two main types of correlators have been suggested so far.

A first type of correlators performs a direct correlation of a replica sequence and the received signal in the time domain. This implies that a dedicated processing step is carried out for each possible correlation phase. In case there is a large number of correlation phases to check, the computational burden is significant, which is critical especially for software based receivers.

There exist different implementation approaches for the first type of correlators. They may be formed in particular with matched filters or ordinary correlators.

The matched filter, for instance, is based on a sliding approach. For each code-phase, a new fragment of an incoming signal, which is shifted versus a previous fragment, is correlated with an available replica code sequence. Due to the computationally heavy operation, the first type of filters is often implemented in hardware.

A second type of correlators relies on frequency domain techniques employing Discrete Fourier Transforms (DFT), which enable a parallel processing for all possible correlation phases. Thus, the DFT based correlators enable a reduction of the computational burden, in particular if the DFTs are realized as Fast Fourier Transforms (FFT).

Nevertheless, the first type of correlators is still widely used. One reason for this is the simplicity of the implementation. While the FFT might be suited to reduce the complexity of the correlator, the use of FFT requires complicated algorithms. Moreover, the FFT approximates calculations due to the quantization of the transform coefficients. Another reason for further performing calculations in the time domain is that while in principle, the phase of the received signal relative to the available replica sequence can have any possible value, in some situations, the range of the possible correlation phases can be reduced based on some a-priori knowledge. Currently, however, a limited search of correlation phases can only be realized with correlators performing a correlation in the time domain. Known DFT based methods inherently perform the search of all possible correlation phases in parallel. Therefore, their usage is not feasible in situations in which the search is to be carried out only over a limited number of all possible correlation phases.

SUMMARY OF THE INVENTION

It is an object of the invention to reduce the computational load required for determining the correlation between samples of a received signal and samples of an available replica sequence in the time domain.

A method is proposed for determining the correlation between consecutive sets of samples of a code modulated signal received at a receiver on the one hand and samples of an available replica code sequence on the other hand. A respective next set of samples is formed by adding at least one new sample of the received signal to a current set of samples and by removing at least the oldest sample from the current set of samples. The samples of a respective set of samples and of the replica code sequence are aligned to each other. Moreover, positions of samples in the replica code sequence are grouped. Each of the grouped positions and a predetermined number of respective subsequent positions form a subgroup and each group comprises the respective first position of all subgroups with positions associated with a similar composition of consecutive samples of the replica code sequence. The proposed method comprises as a first step combining the values of those samples of the first set of samples, which are associated by their position to a respective group, separately for each group to obtain a respective preliminary result. In a next step, the proposed method comprises determining a correlation value for each of the sets of samples by combining the obtained preliminary results for all groups separately for each of the sets of samples. In this combination, the respective composition of consecutive samples of the replica code sequence associated with the subgroups which are associated by their first positions to the respective group are taken into account for each group. In addition, products between samples of the respective set of samples and of the replica code sequence at the same position are added for those positions at which these samples are not comprised in the preliminary results.

Further, a corresponding processing unit and a corresponding system are proposed, each comprising a combining portion for generating the preliminary results and a combining portion for determining the correlation values in accordance with the proposed method.

The proposed processing unit can be for instance a correlator, which may be comprised in the receiver or in some other unit which is able to communicate with the receiver. Alternatively, the processing unit can be given by the receiver itself or by some other unit which is able to receive at least the samples of the signal received by the receiver. The proposed system may comprise for example at least a receiver and a unit which is able on the one hand to communicate with the receiver and on the other hand to carry out the proposed method.

The invention is based on the consideration that while the correlator operation for consecutive correlation stages will be based on different sets of samples of the received signal, most of the samples will stay the same from one iteration to the next. They will only be aligned differently with the samples of the available replica code sequence. A stage in this context means the respective alignment of samples of the received signal and the samples of the replica code sequence corresponding to a particular code-phase. For a respective subsequent stage, the received samples are shifted by at least one sample. The invention is further based on the consideration that in an available replica code sequence, the same composition of values of a predetermined number of consecutive samples will occur several times. It is therefore proposed that similar compositions of replica code sequence samples are grouped by the positions of a respective first sample. The received samples are first combined within the groups, i.e. those received samples which are at positions associated with the same group are combined to form preliminary results. These preliminary results can be for example subsums obtained by adding the respective samples, but equally the results of other calculations performed on the samples. The preliminary results can then be combined to form a correlation value for a plurality of code phases. The same computational results are thus used optimally for several correlation stages.

It is an advantage of the invention that it enables particularly light computations. For example, for a matched filter sized 1024 with the optimum number of stages, the arithmetic complexity is 5-6 times less compared to conventional time domain matched filter implementations, while for a matched filter sized 10230, the arithmetic complexity is 7 times less. At the same time, the proposed solution is simple, since it is carried out in the time domain.

As a consequence, the invention is suited to increase the correlation processing speed several times without approximations and thus without a reduced sensitivity of the correlator. At the same time, the additional problems arising with FFT implementations above mentioned are avoided.

As a further consequence, the complexity of the employed correlator can be reduced with the invention. This will save resources and might even allow to avoid a special hardware usage.

Preferred embodiments of the invention become apparent from the dependent claims.

The positions of the samples can be grouped in different ways. In a first preferred approach, each group comprises the respective first position of all subgroups including consecutive positions associated with an identical composition of replica sample values. In a second preferred approach, each group comprises the respective first position of all subgroups including consecutive positions for which the composition of the differences between the values of the replica samples at all included positions except for the respective first position and the value of the replica sample associated with the respective first position is identical. When combining the preliminary results for obtaining the correlation value for a particular iteration, the way in which the groups are formed has to be taken into account.

The invention can moreover be employed with any type of code, since it is possible to form groups with similar replica samples for any code. A particularly simple processing is obtained for binary codes, for example in the case of a BPSK (binary phase shift keying) modulation of the received signals, where the received samples and the samples of the replica code sequences have values of (−1, +1). In the latter case, each received sample has to be multiplied either to +1 or −1 in the correlation process.

The invention may be used in acquisition and tracking for determining the code phase and the frequency of a remaining complex sinusoidal modulation of a received signal, i.e. of the sinusoidal modulation which remains after the carrier has been wiped off from the received signal based on the known nominal carrier frequency. The code phase is determined according to the peaks of a cross-correlation function, the correlation being calculated at initial code wipe-off stages. The processing for weak signals requires additional coherent and non-coherent integrations. The invention can therefore also be used as a building block for other methods implementing different scenarios of coherent and/or non-coherent processing for possible multiple frequency candidates.

The invention can be implemented in hardware or in software. The invention can be implemented in particular in accordance with the implementation of the employed correlator.

The invention can further be employed in particular, though not exclusively, for CDMA spread spectrum receivers, for instance for a receiver of a positioning system like GPS or Galileo.

The receiver can be for example a part of a mobile phone, and it can be for example inside the mobile phone. This means that the receiver can be for example a separate module or be implemented for example inside the mobile phone. However, the receiver does not have to be combined with a mobile phone. It can be for instance as well a normal GPS receiver which does not have a phone inside the same device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE FIGURES

FIGS. 4a) and b) are two diagrams illustrating the complexity reduction achieved by the embodiment of FIGS. 2 and 3.

DETAILED DESCRIPTION OF THE INVENTION

An exemplary embodiment of the invention, which is implemented in a receiver of a GPS system, will be described with reference to FIGS. 1 to 4.

Figure 1:
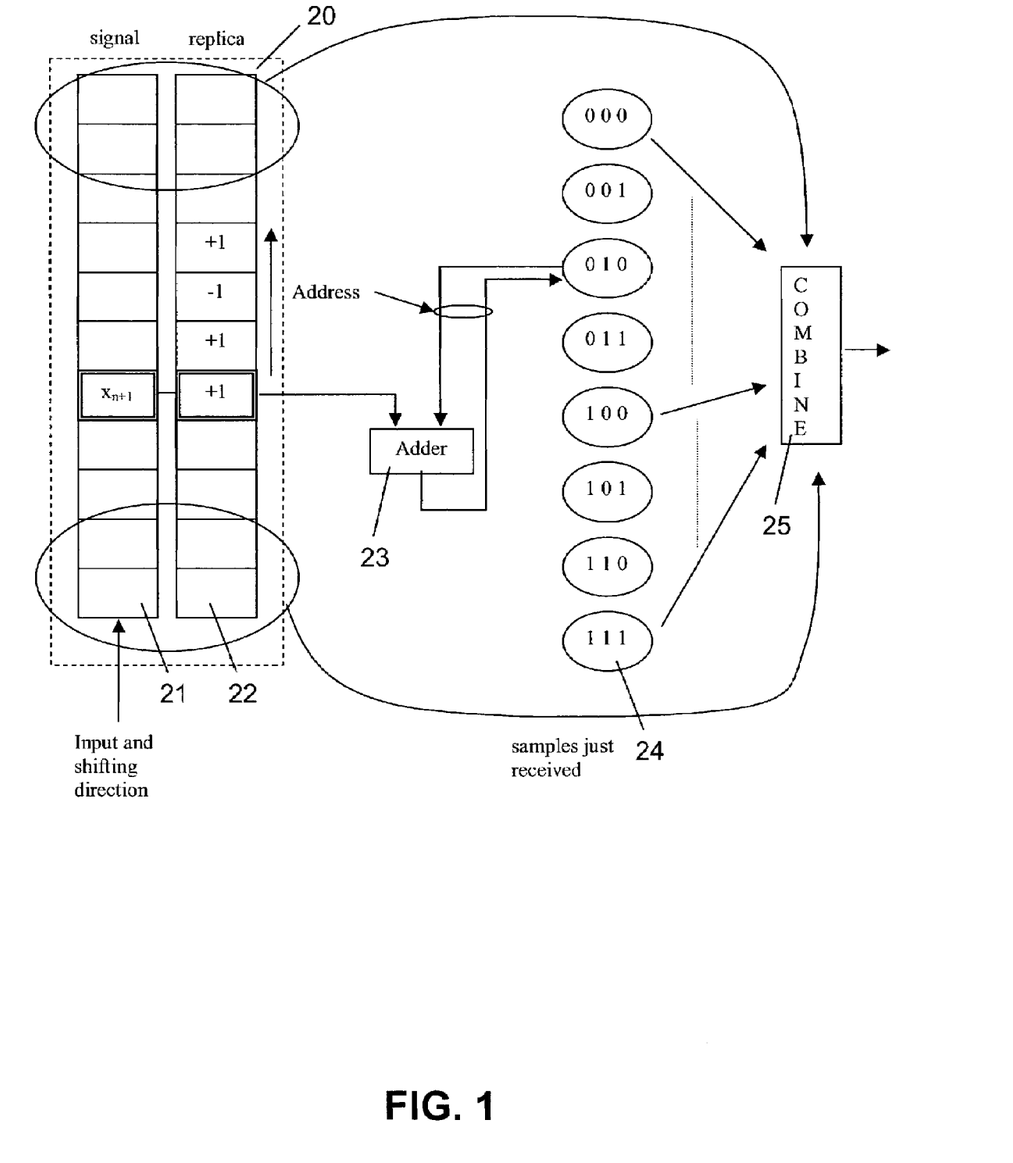
FIG. 1 illustrates an exemplary distribution of sample values in a replica code sequence.

FIG. 1 illustrates schematically the structure of the receiver as far as required for the presented embodiment.

On the left hand side of FIG. 1, a memory 10 of the receiver is indicated with dashed lines. The memory comprises a first portion 11 depicted as a first vertical row and a second portion 12 depicted as second vertical row. When the receiver receives a satellite signal, the known or assumed carrier frequency is wiped off from the received signal, and a set of consecutive samples of the resulting signal is stored in the first memory portion 11 of the memory of the receiver. Moreover, the receiver stores in the memory portion 12 a replica code sequence which corresponds to the code sequence employed by a satellite of the GPS system. Alternatively, the replica code sequence could be generated in real-time. The GPS system uses BPSK (binary phase shift keying) PRN codes consisting of only +/−1. Therefore, the stored samples of the received signal constitute a binary sequence, and accordingly also the stored replica code sequence is a binary sequence.

Figure 2:
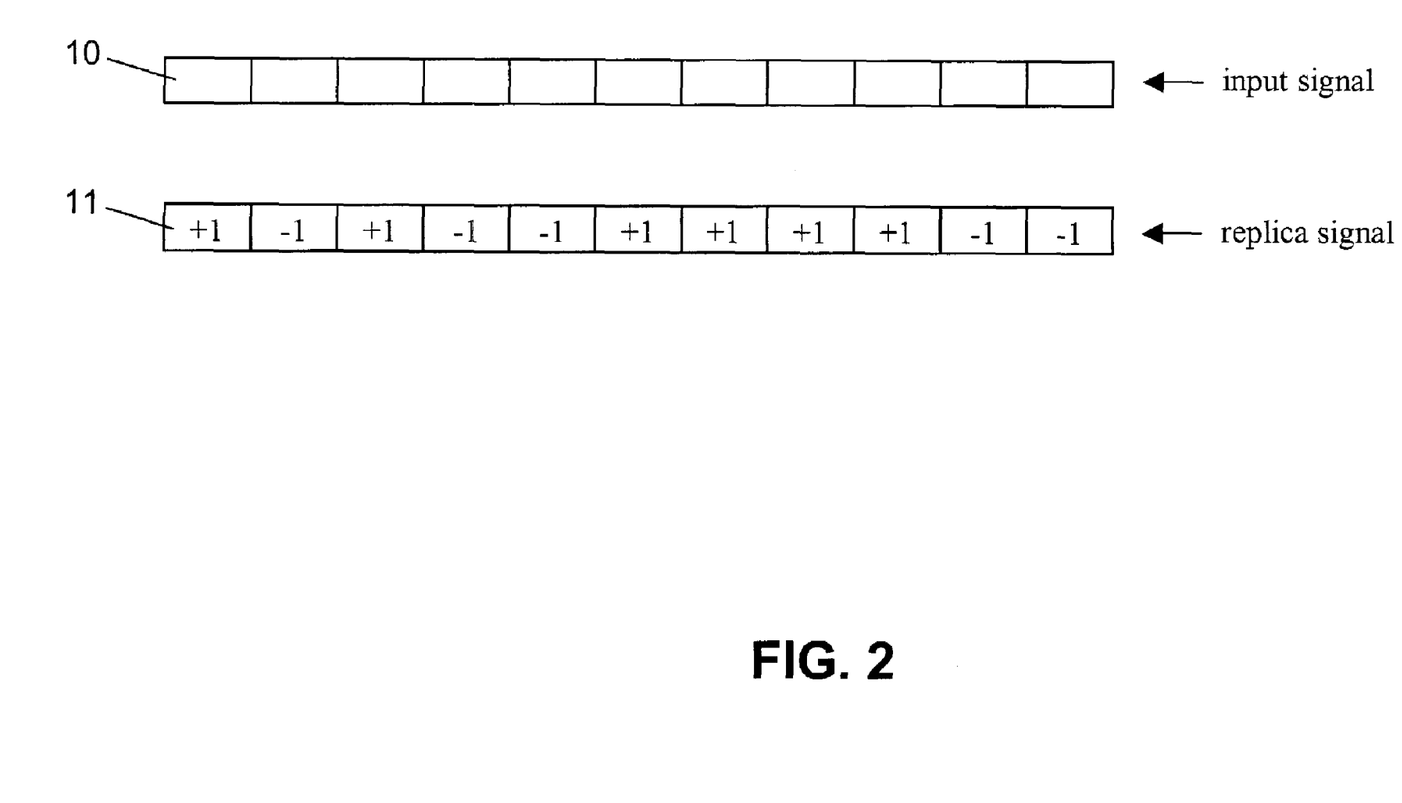
FIG. 2 is a diagram illustrating an embodiment of the invention.

The samples in the first memory portion 21 and the second memory portion 22 of the memory of the receiver are aligned to each other, which is illustrated in FIG. 2.

A first horizontal row 20 represents samples of the received signal, which are stored in the first memory portion 11. A second horizontal row 21 represents samples of the replica code sequence, which are stored in the second memory portion 12. To each position of the stored samples of the received signal corresponds a position of the stored replica code sequence. While the signs of the stored samples of a received signal change, the sign usage for each sample of the stored replica code sequence is known to the receiver. Thus, also the sign changes from one sample of the replica code sequence to the next is predictable in the receiver.

In the receiver, further a matched filter algorithm is implemented for calculating the correlation between the samples of a received signal and of the available replica code sequence. The matched filter algorithm combines the calculations for a predetermined number of sets of samples of the received signal, i.e. for a predetermined number of possible code phases.

To this end, the memory 10 is connected via an adder 13 to a register bank 14 having a plurality of registers. The register bank 14 is connected in addition to a combining section 15.

The number of registers in the register bank 14 depends on the number of consecutive sets of received samples for which the calculation of the correlation values is to be combined, as will be explained in the following.

Since the replica code sequence is known, it is possible to determine for a specific sample of the received signal the value of a sample of the stored replica code sequence at the respective same position for an initial set of samples and for a predetermined number of following sets of samples. The positions of these values of consecutive samples of the stored replica code sequence constitute a subgroup. The values of consecutive samples of the stored replica code sequence can be combined in various ways.

In a first alternative, the sign changes of the replica sample values determined for the predetermined number of following sets of samples compared to the replica sample value determined for the initial set of samples are predicted for all commonly used samples.

The sign changes can be coded as binary numbers, where '0' indicates no change of sign while '1' indicates a change of sign. This code may be saved or calculated in real-time for each relevant sample of the stored replica code sequence. If calculated in real-time, the calculations involve only logical operations with the replica bits, i.e. with digits, and are simple.

The composition of the binary numbers for a specific received sample constitutes a binary word. The more sets of samples of the received signal are to be considered in the combined calculations, the more binary words are possible. If an initial set of samples and K following sets of samples are to be considered, then the binary words will be consisting of K bits and the number of different combinations will be $2^K$. For example, a resulting binary word of (01010) for a specific received sample would mean that 5 sets of samples following the initial set of samples of the received signal are to be considered in the combined calculations. In the $1^{st}$, $3^{rd}$ and $5^{th}$ following sets, the specific received sample is aligned with a replica sample having the same sign as in the initial set, while in the $2^{nd}$ and $4^{th}$ following sets, the specific received sample is aligned with a replica sample having a different sign than in the initial set.

In a second alternative, not sign changes are considered for forming binary words, but the values of the replica samples themselves which are determined for the initial set of samples and the predetermined number of following sets of samples to be aligned to a specific received sample. These replica sample values can be coded as binary numbers, where '0' stands for a value of −1 while '1' stands for a value of +1. Also this code may be saved or calculated in real-time for each relevant sample of the stored replica code sequence. In the second alternative, a resulting binary word of (01010) would mean that 5 consecutive sets of samples are to be considered in the combined calculations, including the initial set of samples. The value of the replica sample for the 1st, 3rd and 5th sets of samples is −1, and the value of the replica sample for the 2nd and 4th sets is +1.

In both alternatives, each register is associated with another one of all possible binary words.

The presented embodiment of the invention makes use of the first described alternative. The calculations based on an initial set of samples of the received signal will also be referred to as initial stage and the calculations based on the following sets of samples of the received will also be referred to as predictive stages.

In the example of FIG. 1, which is to predict three stages, there will be eight possible compositions of sign changes and thus eight different possibly binary words:

(000), (001), (010), (011), (100), (101), (110), (111)

Thus, the register bank 14 comprises eight registers. Each of these registers can be addressed by another one of the eight possible binary words.

The matched filter operation in the receiver will be explained in the following with reference to FIG. 3, which is a flow chart illustrating the parallel matched filter algorithm implemented in the receiver.

For performing the matched filter operation, samples of the received signal are input from below to the first memory portion 11 of FIG. 1 and shifted for each matched filter iteration upwards by one sample. For the $i^{th}$ matched filter iteration, the stored samples are denoted as:

$x_{N-1+i}, x_{N-2+i}, \ldots, x_{3+i}, x_{2+i}, x_{1+i}, x_i$, where N is the number of samples and the matched filter size. The $i^{th}$ matched filter iteration is to correspond to the current initial stage.

For the next iteration, the stored samples are denoted as:

$x_{N+i}, x_{N-1+i}, x_{N-2+i}, \ldots, x_{3+i}, x_{2+i}, x_{1+i}$, and after the $k^{th}$ iterations as:

$x_{N-1+k+i}, x_{N+k-1+i}, x_{N+k-2+i}, \ldots, x_{k+2+i}, x_{k+1+i}, x_{k+i}$.

Thus, the received signal samples are shifted from one iteration to the next from left to right.

The memory portion 12 storing the replica code sequence comprises a fixed set of samples denoted in an analogous way as:

$r_{N-1}, r_{N-2}, \ldots, r_3, r_2, r_1, r_0$

As can be seen, the same samples $x_{N-1+i}, x_{N-2+i}, \ldots, x_{k+2+i}, x_{k+1+i}, x_{k+i}$ are used in k consecutive iterations, they are only aligned differently with the replica code sequence.

In a conventional matched filter operation, the samples of the received signal are multiplied for each iteration element-wise to samples of the replica code sequence, and the resulting products are integrated for obtaining correlation values $C_i$ for the particular iteration i and thus the particular code phase according to the equation:

$$C_i = \sum_{j=0}^{N-1} r_j x_{j+i}$$

The matched filter is a "sliding" operation, and most of the samples from a specific iteration are still used for the next iterations. The invention makes use of this fact by combining the calculations for a predetermined number of subsequent sets of received samples. Compared to the conventional matched filter operation, the matched filter operation according to the invention thereby results in the same correlation values $C_i$ with a reduced amount of processing.

The sum in the above equation for $C_i$ can be split up, taking out the K oldest samples, $$C_i = \sum_{j=0}^{N-1} r_j x_{j+i} = r_0 x_i + \ldots + r_{K-1} x_{i+K-1} + \sum_{j=K}^{N-1} r_j x_{j+i},$$

where K denotes the number of desired predictive stages. In the example of FIG. 1, K is equal to 3.

The remaining sum can further be split up into several subsums, which depend on how the replica samples change their signs.

Corresponding to the above identified $2^K$ possible binary words (000) to (111) for addressing the registers, $2^K$ groups of K samples with different sign changes are defined, which are denoted as $J_{b_1 \ldots b_K}$. $b_1 \ldots b_K$ is the notation of sign changes of the samples in a group with respect to the sample at a respective first position, i.e. $-b_p = (r_j \cdot r_{j-p})$ with $p=1 \ldots K$. In the embodiment of FIG. 1, there are thus eight groups $J_{-1-1-1}$ to $J_{+1+1+1}$, each identifying another group of replica samples with similar sign change behavior.

A position j is defined to belong to a specific one of the groups $J_{b_1 \ldots b_K}$, if the sign changes of the values of the samples at positions j−1 to j−K in the replica code sequence versus the value of the sample at position j in the replica code sequence correspond to the values of $b_1 \ldots b_K$ of this group, i.e. $j \in J_{b_1 \ldots b_K}$ if $(r_j r_{j-1} \ldots r_{j-K}) = \pm(1, b_1, \ldots, b_K)$ with $j=K, \ldots, N-1$.

Now, the subsums of samples $S_m$ are calculated in each group for the current iteration i according to the equation:

$$S_{m,i} = \sum_{j \in J_{b_1 \ldots b_K}} r_j x_{j+i}$$

where $m=(m_1, \ldots, m_K)=0, 1, \ldots, 2^K-1$ is reserved for indexing the groups $J_{b_1 \ldots b_K}$ with $$m_p = \begin{cases} 1 & b_p = 1 \\ 0 & b_p = -1 \end{cases} \text{ and } p = 1 \ldots K.$$

In the example of FIG. 1, the index m thus corresponds to a respective one of the above listed eight binary words (000) to (111) having the values 0 to 7. The index m thereby associates the respective subsum $S_{m,i}$ to one of the eight different groups $J_{b_1 \ldots b_K}$.

For calculating the subsum $S_{m,i}$ for each group, the matched filter algorithm in the receiver of FIG. 1 first initializes the value in each of the $2^K$ registers of the register bank 14 to zero. Each of the register values constitutes the current value of one of the subsums $S_{m,i}$, the index m identifying the respective register. This is indicated as step 301 of FIG. 3.

Then, the matched filter algorithm processes all but the oldest K stored samples $x_{j+i}$ of the initial set of samples of the received signal one after the other for forming the subsums $S_{m,i}$, i.e. $j=K, \ldots, N-1$.

To this end, a respective stored received samples $x_{j+i}$ is multiplied with the sample $r_j$ of the replica code sequence at the same position j. The product is provided to the adder 23.

Further, a register address is generated by combining the sample at position j of first replica code sequence separately with each of the samples of the replica code sequence at positions j-1 to j-K. This combination can be achieved for example by means of an XOR logic. The address comprises a value '0' for each sample of the replica code sequence at one of positions j-1 to j-K which is equal to the sample of the replica code sequence at position j, and a value '1' for each sample of the replica code sequence at a position j-1 to j-K which is different from the sample of the replica code sequence at position j.

In the example of FIG. 1, a sample $x_{n+i}$ of the received signal is shown at position j=n. The samples of the replica code sequences at positions n to n−K, with K=3, are indicated to be $r_n=+1$, $r_{n-1}=+1$, $r_{n-2}=-1$, $r_{n-3}=+1$. These samples are converted into a register address (010).

The obtained register address is used for retrieving the current value of the subsum $S_{m,i}$ for the corresponding group, e.g. $S_{(010), i}$ or $S_{2, i}$, from the associated register of the register bank 14. This subsum $S_{m,i}$ value is equally provided to the adder 13. The adder 13 adds the received product $r_j x_{j+i}$ to the received subsum $S_{m,i}$ and stores the new subsum $S_{m,i}$ into the addressed register of the register bank 14 again. Generating the subsums $S_{m,i}$ is indicated in FIG. 3 as step 302.

This procedure is performed analogously for all received samples $x_{j+i}$ with j=K, . . . , N−1 which are currently stored in the first portion 11 of the memory 10 of the receiver.

The combining unit 15 of the receiver of FIG. 1 then combines the stored subsums $S_{m,i}$ to obtain the desired K+1 correlation values $C_{i+k}$ with k=0, . . . , K.

For the initial stage i, i.e. for the initial set of samples, the correlation value $C_i$ is simply calculated as:

$$C_i = r_0 x_i + \ldots + r_{K-1} x_{i+K-1} + \sum_{m=0}^{2^K-1} S_{m,i}$$

Figure 3:
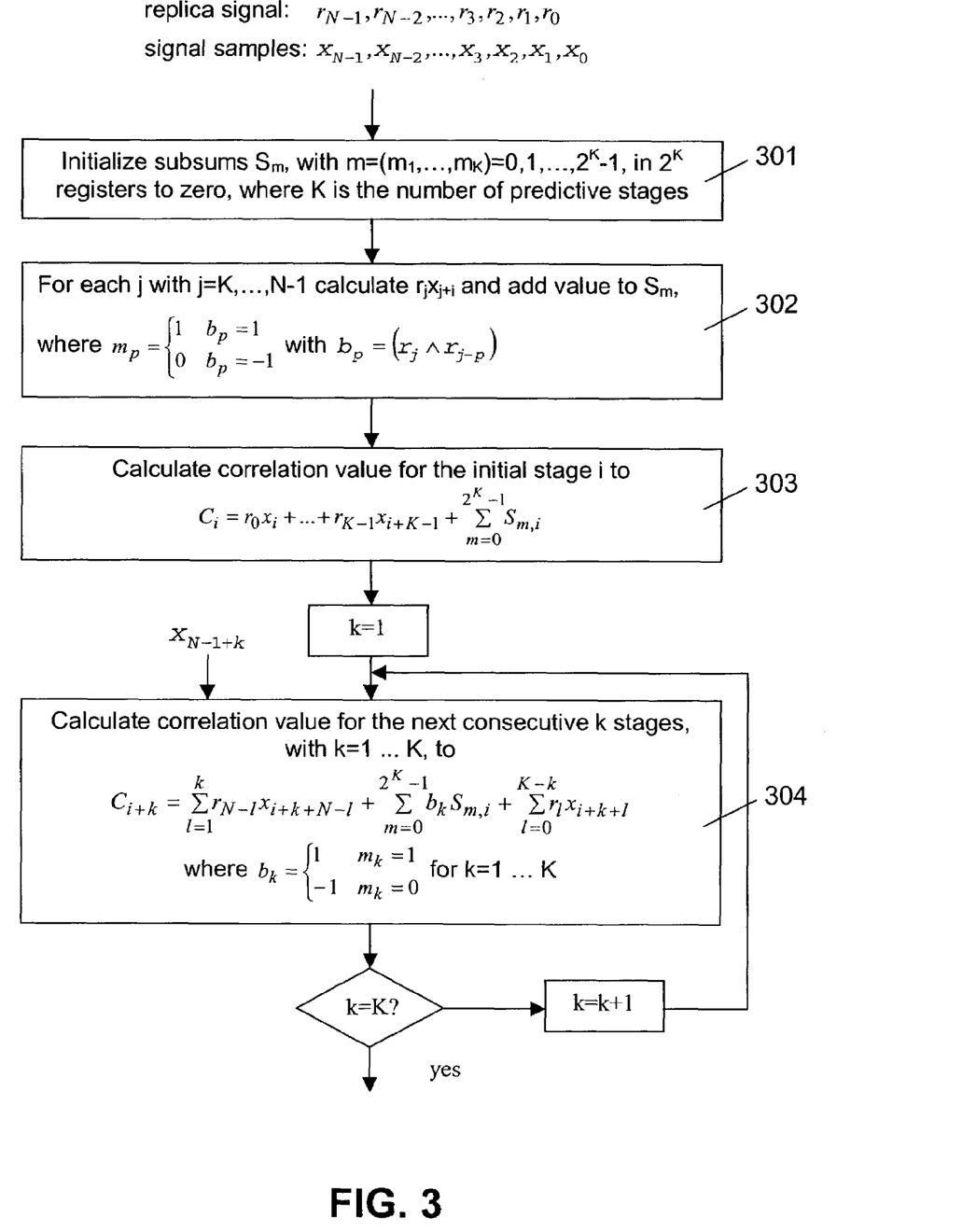
FIG. 3 is a flow chart illustrating the embodiment of FIG. 2.
Figure 4:
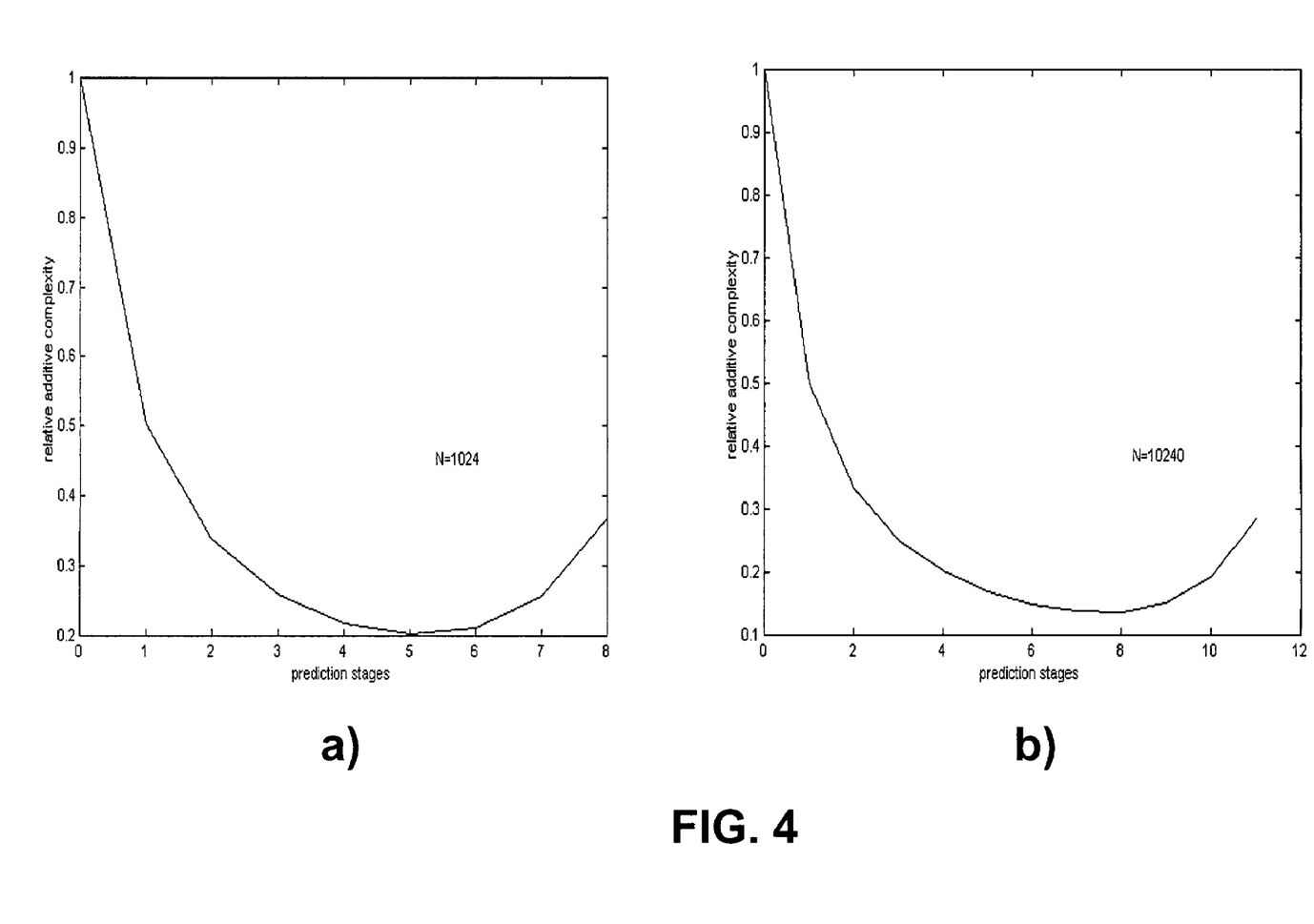

This is indicated in FIG. 3 as step 303.

The first K terms on the left hand side of the equation comprise the products of the K oldest stored samples of the received signal with the respectively aligned replica samples, which are not comprised in the subsums $S_{m,i}$.

For the K predictive stages i+k, with k=1, . . . , K, the respective sign change in each group is taken into account when combining the subsums $S_{m,i}$.

For each of the stages i+k, a new sample of the received signal is added to the first memory portion 21 and the oldest stored sample is removed from the memory portion 21. The correlation value $C_{i+k}$ for a specific stage i+k is then calculated to be:

$$C_{i+k} = \sum_{l=1}^{k} r_{N-1} x_{i+k+N-1} + \sum_{m=0}^{2^K-1} b_k S_{m,i} + \sum_{l=0}^{K-k-1} r_l x_{i+k+l}$$

where for a respective value of m with m=$(m_1, \ldots, m_K)$, $b_k$ is defined to be $$b_k = \begin{cases} 1 & m_k = 1 \\ -1 & m_k = 0 \end{cases}$$

for the $(i+k)^{th}$ stage, with k=1, . . . , K. Thus, the respective value of $b_k$ depends on the replica code sequence k and on the group m for which it is needed in the middle sum combining subsums $S_{m,i}$. The first sum in the equation sums in addition the products of the respective newest stored samples of the received signal with the respectively aligned replica samples, while the third sum in the equation sums the products of the respective oldest stored samples of the received signal with the respectively aligned replica samples, these products not being comprised in the subsums $S_{m,i}$.

In the example of FIG. 1, a dedicated correlation value $C_{i+1}$, $C_{i+2}$, $C_{i+3}$ has to be calculated for K=3 predictive stages in addition to the correlation value $C_i$ for the initial stage, thus the number of groups is eight. The middle sum in the equation for calculating a respective correlation value $C_{i+k}$ therefore runs from m=0 to m=7. In the third term of the middle sum, for instance, m is equal to 2 and corresponds as binary word to m=$(m_1, m_2, m_3)$=(010). For the first predictive stage i+1, k is equal to 1 and therefore $m_k=m_1=0$. As consequence, $b_k$ is equal to +1. Thus, the third term of the middle sum for calculating the correlation value $C_{i+1}$ for the first predictive stage is $b_k S_m = (+1)^* S_2$. The other terms of the middle sum are determined analogously for each of the predictive stages.

The calculation of the correlation values $C_{i+k}$ is indicated in FIG. 3 as step 304.

The described process is repeated for various initial stages i such that a correlation value is determined for all possible code phases. The highest correlation value obtained in this process identifies the code phase of the received signal.

It is to be noted that with the assumed binary code, the multiplications constitute just sign changes. Therefore, the equations for calculating the correlation values comprise only additions. The number of additions is $K+2^K$ for the initial stage and the next K prediction stages. Further, (N−K−1) additions are required for calculating the subsums $S_{m+i}$. A conventional matched filter, in contrast, requires (N−1)(K+1) additions. Thus the achieved complexity reduction is $$\frac{(K+1)(K+2^K) + N - K - 1}{(N-1)(K+1)}.$$

The achieved complexity reduction is depicted in FIG. 4a) over the number of prediction stages K for a sequence length of N=1024 and in FIG. 4b) over the number of prediction stages K for a sequence length of N=10240. It can be seen that for 5 predictive stages, the complexity is reduced in both cases by a factor of about 5 with the presented embodiment of the invention, while for the sequence length of 10240, the reduction is even higher in the case of 6-9 predictive stages.

With the above described exemplary embodiment, it becomes apparent that it is not necessary to compute matched filter results for all stages using all received signal samples. It is sufficient to calculate once a subsum for various groups of positions, and then to combine these subsums differently. Since these subsums are the same for all stages, a reduction of the computational load can be achieved.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all compositions of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining the correlation between consecutive sets of samples of a code modulated signal received at a receiver on the one hand and samples of an available replica code sequence on the other hand, a respective next set of samples being formed by adding at least one new sample of said received signal to a current set of samples and by removing at least the oldest sample from said current set of samples, the samples of a respective set of samples and of said replica code sequence being aligned to each other, wherein positions of samples in said replica code sequence are grouped, each of said grouped positions and a predetermined number of respective subsequent positions forming a subgroup and each group comprising the respective first position of all subgroups with positions associated with a similar composition of consecutive samples of said replica code sequence, said method comprising:

combining the values of those samples of a first set of samples, which are associated by their position to a respective group, separately for each group to obtain a respective preliminary result;

determining a correlation value for each of said sets of samples by combining the obtained preliminary results for all groups separately for each of said sets of samples taking into account for each group the respective composition of consecutive samples of said replica code sequence associated with those subgroups which are associated by their first positions to the respective group, and by adding the products between samples of the respective set of samples and of said replica code sequence at the same position for those positions at which said samples are not comprised in said preliminary results; and using said correlation value for each of said sets of samples to determine the correlation between each of said sets of samples and said replica code sequence.

2. The method according to claim 1, wherein each group comprises the respective first position of all subgroups including consecutive positions associated with an identical composition of sample values of said replica code sequence.

3. The method according to claim 1, wherein each group comprises the respective first position of all subgroups including consecutive positions for which the composition of the differences between the values of the replica samples at all included positions except for the respective first position and the value of the replica sample associated with the respective first position is identical.

4. The method according to claim 3,
wherein the number of samples in each of said sets of samples and the number of samples of said replica code sequence is N, and wherein the number of said sets of samples is K+1,
wherein the employed code is a binary code using sample values of +1 and −1, the samples of the $k^{th}$ set of samples proceeding from an $i^{th}$ iteration stage being denoted as: $x_{N-1+k+i}, x_{N+k-1+i}, x_{N+k-2+i}, \ldots, x_{k+2+i}, x_{k+1+i}, x_{k+1}$, with k=0 to K, and the samples of said replica code sequence being denoted as:

$r_{N-1}, r_{N-2}, \ldots, r_3, r_2, r_1, r_0;$ wherein $2^K$ groups $J_{b_1 \ldots b_K}$ are defined, $b_1 \ldots b_K$ being a notation of sign changes with $b_p = (r_j \cdot r_{j-p})$, p=1 . . . K, and wherein a position j is defined to belong to a specific one of said groups $J_{b_1 \ldots b_K}$, if $(r_j r_{j-1} \ldots r_{j-k}) = \pm(1, b_1, \ldots, b_k)$ with j=k, . . . , N−1;

wherein said preliminary result for each group is determined to be $$S_{m,i} = \sum_{j \in J_{b_1 \ldots b_K}} r_j x_{j+i},$$

where $m = (m_1, \ldots, m_K) = 0, 1, \ldots, 2^K - 1$ with $$m_p = \begin{cases} 1 & b_p = 1 \\ 0 & b_p = -1 \end{cases} \text{ and } p = 1 \ldots K;$$

and p=1. . . K;
wherein for said first set of samples, the correlation value is determined to be $$C_i = r_0 x_i + \ldots + r_{K-1} x_{i+K-1} + \sum_{m=0}^{2^K-1} S_{m,i};$$

and
wherein for the $k^{th}$ set of samples, the correlation value is determined to be $$C_{i+k} = \sum_{l=1}^{k} r_{N-l} x_{i+k+N-l} + \sum_{m=0}^{2^K-1} b_k S_{m,i} + \sum_{l=0}^{K-k-1} r_l x_{i+k+l},$$

where for a respective value of m with m =$(m_1, \ldots, m_K)$, $b_k$ is defined to be $$b_k = \begin{cases} 1 & m_k = 1 \\ -1 & m_k = 0 \end{cases}$$

for the $(i+k)^{th}$ stage, with k=1, . . . , K.

5. The method according to claim 1, wherein it is determined whether a sample at a particular position in said received signal is associated by its position to a particular group by evaluating the composition of the values of the samples of said replica code sequence at said particular position and the following K−1 positions.

6. The method according to claim 5, wherein the employed code is a binary code, and wherein said composition of the values of the samples of said replica code sequence at said particular position is evaluated by means of an XOR logic.

7. The method according to claim 1, wherein said signal received at a receiver is a signal transmitted by a satellite of a satellite positioning system.

8. A processing unit for determining the correlation between consecutive sets of samples of a code modulated signal received at a receiver on the one hand and samples of an available replica code sequence on the other hand, a respective next set of samples being formed by adding at least one new sample of said received signal to a current set of samples and by removing at least the oldest sample from said current set of samples, the samples of a respective set of samples and of said replica code sequence being aligned to each other, wherein positions of samples in said replica code sequence are grouped, each of said grouped positions and a predetermined number of respective subsequent positions forming a subgroup and each group comprising the respective first position of all subgroups with positions associated with a similar composition of consecutive samples of said replica code sequence, said processing unit cormprising:

a combining portion for combining those values of the samples of a first set of samples of a received signal, which are associated by their positions to a respective group, separately for each group to obtain a respective preliminary result;

a combining portion for determining a correlation value for each of said sets of samples by combining the obtained preliminary results for all groups separately for each of said sets of samples taking into account for each group the respective composition of consecutive samples of said replica code sequence associated with the subgroups which are associated by their first positions to the respective group, and by adding the products between samples of the respective set of samples and of said replica code sequence at the same position for those positions at which said samples are not comprised in said preliminary results; and a determining portion for determining the correlation between each of said sets of samples and said replica code sequence using said correlation value for each of said sets of samples.

9. The processing unit according to claim 8, wherein said processing unit is a correlator.

10. The processing unit according to claim 9, wherein said processing unit is a matched filter.

11. The processing unit according to claim 8, wherein said processing unit is said receiver receiving said code modulated signal.

12. The processing unit according to claim 8, wherein said processing unit comprises a receiving component for receiving said samples of a signal received at said receiver from said receiver.

13. A system for determining the correlation between consecutive sets of samples of a code modulated signal received at a receiver on the one hand and samples of an available replica code sequence on the other hand, a respective next set of samples being formed by adding at least one new sample of said received signal to a current set of samples and by removing at least the oldest sample from said current set of samples, the samples of a respective set of samples and of said replica code sequence being aligned to each other, wherein positions of samples in said replica code sequence are grouped, each of said grouped positions and a predetermined number of respective subsequent positions forming a subgroup and each group comprising the respective first position of all subgroups with positions associated with a similar composition of consecutive samples of said replica code sequence, said system comprising:

a combining portion for combining those values of the samples of a first set of samples of a received signal, which are associated by their positions to a respective group, separately for each group to obtain a respective preliminary result;

a combining portion for determining a correlation value for each of said sets of samples by combining the obtained preliminary results for all groups separately for each of said sets of samples taking into account for each group the respective composition of consecutive samples of said replica code sequence associated with the subgroups which are associated by their first positions to the respective group, and by adding the products between samples of the respective set of samples and of said replica code sequence at the same position for those positions at which said samples are not comprised in said preliminary results; and a determining portion for determining the correlation between each of said sets of samples and said replica code sequence using said correlation value for each of said sets of samples.

14. A computer program product for determining the correlation between consecutive sets of samples of a code modulated signal received at a receiver on the one hand and samples of an available replica code sequence on the other hand, a respective next set of samples being formed by adding at least one new sample of said received signal to a current set of samples and by removing at least the oldest sample from said current set of samples, the samples of a respective set of samples and of said replica code sequence being aligned to each other, wherein positions of samples in said replica code sequence are grouped, each of said grouped positions and a predetermined number of respective subsequent positions forming a subgroup and each group comprising the respective first position of all subgroups with positions associated with a similar composition of consecutive samples of said replica code sequence, said computer program product comprising computer readable software code stored on a computer readable medium, said computer readable software code realizing the following when executed by a computer:

combining the values of those samples of a first set of samples, which are associated by their position to a respective group, separately for each group to obtain a respective preliminary result;

determining a correlation value for each of said sets of samples by combining the obtained preliminary results for all groups separately for each of said sets of samples taking into account for each group the respective composition of consecutive samples of said replica code sequence associated with those subgroups which are associated by their first positions to the respective group, and by adding the products between samples of the respective set of samples and of said replica code sequence at the same position for those positions at which said samples are not comprised in said preliminary results; and using said correlation value for each of said sets of samples to determine the correlation between each of said sets of samples and said replica code sequence.

* * * * *

UNITED STATES PATENT AND TRADEMARK OFFICE
CERTIFICATE OF CORRECTION

PATENT NO. : 7,272,168 B2  Page 1 of 1
APPLICATION NO. : 10/404931
DATED : September 18, 2007
INVENTOR(S) : Akopian It is certified that error appears in the above-identified patent and that said Letters Patent is hereby corrected as shown below:

1. In column 12, line 23, claim 4, line 29 "and p=1...K;" should be deleted.

Signed and Sealed this

Twenty-fourth Day of June, 2008

JON W. DUDAS
*Director of the United States Patent and Trademark Office*